(12) United States Patent
Taylor

(10) Patent No.: US 10,398,094 B2
(45) Date of Patent: Sep. 3, 2019

(54) IMPERMEABLE SECTIONAL APPARATUS FOR SOIL MOISTURE RETENTION

(71) Applicant: Martin W. Taylor, Denver, CO (US)

(72) Inventor: Martin W. Taylor, Denver, CO (US)

( * ) Notice: Subject to any disclaimer, the term of this patent is extended or adjusted under 35 U.S.C. 154(b) by 225 days.

(21) Appl. No.: 15/596,718

(22) Filed: May 16, 2017

(65) Prior Publication Data

US 2018/0332778 A1 Nov. 22, 2018

(51) Int. Cl.
*A01G 13/02* (2006.01)
*A01G 25/02* (2006.01)

(52) U.S. Cl.
CPC ......... *A01G 13/0281* (2013.01); *A01G 25/02* (2013.01)

(58) Field of Classification Search
CPC .. A01G 13/02; A01G 13/0237; A01G 13/281; A01G 25/02; A01G 25/023
See application file for complete search history.

(56) References Cited

U.S. PATENT DOCUMENTS

| | | | | |
|---|---|---|---|---|
| 219,987 A | * | 9/1879 | Scott | A01G 13/0243 47/32.4 |
| 4,642,938 A | * | 2/1987 | Georges | A01G 13/0237 47/2 |
| 4,700,507 A | * | 10/1987 | Allen | A01G 13/0243 47/32.4 |
| 5,878,528 A | * | 3/1999 | Pattyn | A01G 13/0281 47/32 |
| D409,057 S | * | 5/1999 | Wagner | D8/1 |
| 6,385,900 B1 | * | 5/2002 | George | A01G 29/00 47/40.5 |
| 7,967,003 B2 | * | 6/2011 | Lindsly | A47J 33/00 126/25 R |
| 8,296,995 B1 | * | 10/2012 | Georges | A01G 13/0243 47/20.1 |
| 8,683,741 B2 | * | 4/2014 | Castagno | A01G 13/043 206/423 |

FOREIGN PATENT DOCUMENTS

BR 2016-67559 B * 10/2016 ............. A01G 13/02

* cited by examiner

*Primary Examiner* — Monica L Williams
*Assistant Examiner* — Aaron M Rodziwicz
(74) *Attorney, Agent, or Firm* — Williams Intellectual Property; Benjamin F. Williams

(57) ABSTRACT

An impermeable sectional apparatus for soil moisture retention has a frustoconical member separable along a medial longitudinal axis into a first section and a second section for connection around a plant to inhibit evaporation from the soil matrix. Securement of the first and second sections together is effective by mating engagement between each of a first male edge with a second female edge and a first female edge with a second male edge. A plurality of rectilinear insert sections is fittable in between each of the first and second sections engaged by edgewise interconnection therebetween, whereby the frustoconical member may be elongated to cover more ground surface. Additionally, a polychromic material is included devised to signal a color change to a user in response to an environmental stimulus.

15 Claims, 11 Drawing Sheets

US 10,398,094 B2

IMPERMEABLE SECTIONAL APPARATUS FOR SOIL MOISTURE RETENTION

CROSS-REFERENCE TO RELATED APPLICATIONS

This continuation-in-part application claims the benefit of application Ser. No. 15/146,963 filed on May 5, 2016

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Many plant protection systems and ground covers are known in the prior art devised to prevent frosting of the rhizosphere proximal to cultivated plants and to conserve water during irrigation. Most are flexible polymeric devices consisting of singular units of particular sizes. Some actually conceal the ground surface impeding discernment of soil moisture retention thereat. What is needed, then, is an impermeable sectional apparatus for soil moisture retention that is sized specifically to fit within the perimeter of standard pot sizes, comprises separable elements for resizing to accommodate different plants and plant beds, is expediently erectable around a cultivated plant to inhibit evaporation of irrigation water (and other fluids) from the ground surface while securing an irrigation line in an appropriate position to introduce water into the rhizosphere, and signals to a user a soil moisture status whereby lack of.

The present impermeable sectional apparatus for soil moisture retention, therefore, includes a first section and a second section completely separable and connectable together to form a frustoconical member, whereby a frustoconical covering is erectable to cover the ground surface immediately encircling a plant to prevent evaporation of water irrigated thereunder. The frustoconical member is further devised to signal soil moisture status of the underlying ground surface to a user whereby said user may determine functionality of irrigation thereat.

FIELD OF THE INVENTION

The present impermeable sectional apparatus for soil moisture retention has been devised to fit covering a soil surface in a standard sized plant pot or, alternately, to cover a ground surface surrounding a cultivated plant when grown in beds outside.

The present impermeable sectional apparatus for soil moisture retention is lightweight and expediently erectable around a desired plant, or plants as case may be, to inhibit evaporation of water from the soil or ground surface into the ambient atmosphere. The present invention thus assists in water conservation and controls humidity in conditioned spaces, when used indoors.

The present impermeable sectional apparatus for soil moisture retention, therefore, includes a first section and a second section connectable together to form a frustoconical member. The frustoconical member enables creation of a microclimate underneath each of a first and second curved surfaces, whereby moisture volatilizing from soil pores at the ground surface is enabled condensation along a saturation gradient defined by each of said first and second curved surfaces of the frustoconical member, whereby water vapor is returnable to the soil matrix in the liquid phase and inhibited from being borne away into the ambient atmosphere.

Moisture is thus conserved underneath the frustoconical member and a greater proportion of irrigated water is maintained available for the plant in question. An irrigation line is securable into an insert aperture whereby water is producible directly into the ground surface disposed underlying the frustoconical member and the frustoconical member is configured to signal a soil moisture status to a user.

SUMMARY OF THE INVENTION

The present impermeable sectional apparatus for soil moisture retention has been devised for expedient erection around a cultivated plant to inhibit evaporation of water from the rhizosphere proximal said cultivated plant into the ambient atmosphere, to thereby conserve water. Moreover, in the modern era, many plants are cultivatable indoors whereby conditions, constrained within the interior and conditioned space, are affected by rates of evapotranspiration whereby excess humidity generable within a conditioned space may inadvertently increase risk of fungal invasions and engender additional expenditures directed to dehumidification, pest, and fungal controls. The present invention mitigates such concerns by inhibiting evaporation from the soil matrix.

The term "polychromic" as used herein throughout is taken to include chromatic variance of a material in response to a changing environmental condition or stimulus whereby a color change is visually signified to a user. The term "thermochromic" is taken to mean exhibiting a change of color across a temperature gradient or at a particular temperature threshold. The term "hydrochromic" is taken to mean exhibiting a change of color along an osmotic potential gradient or at a particular osmotic potential or pressure.

The term "enantiomorphic", as used herein throughout, is taken according to the etymological root, and not as particularly used when defining sterotropism in molecular structures, and is thereby significant of structures related as mirror images.

The present impermeable sectional apparatus for soil moisture retention, therefore, includes a frustoconical member erectable around a cultivated plant. The frustoconical member is assembled from interconnection of each of a first section and a second section connectable together along a medial longitudinal axis whereby an aperture, disposed at a truncated apex of said frustoconical member, enables accommodation of a plant stem therethrough. The first section includes a first semicircular edge disposed to contact an underlying ground surface and the second section includes a second semicircular edge which, when united with the first semicircular edge, forms a perimeter circumferentially bounding the ground surface proximal the plant.

Each of the first and second sections is connectable by edgewise engagement wherein a male edge and a female edge of the first section mate into a corresponding female edge and a male edge of the second section respectively. Each male edge therefore includes a first configuration of tooth members, disposed recessed and serried projecting perpendicularly from each said male edge. Each tooth member disposed upon each male edge is spaced apart to accommodate interlacing engagement with a second configuration of tooth members disposed recessed and serried projected perpendicularly from each corresponding female edge. Thus interlacing engagement of the first and second configurations of tooth members enables fastening of each male edge to each female edge and the first and second sections are thereby releasably securable together formative of the frustoconical member.

Thus each of the first and second sections is edgewise engaged to secure together formative of the frustoconical member about a stem of a cultivated plant. The frustoconical member may be sized appropriately to nestle inside a standardized plant pot circumference, whereby the top of said standardized plant pot is coverable by the present device. The present device may, therefore, be manufactured at various sizes devised to cover the exposed top of various standard pot sizes. The present device may be formed of polymer, or other lightweight material, and may be three-dimensionally printed by action of an additive printer.

At least the first section also includes an insert aperture disposed therein for engagement with an existing nozzle of a drip irrigation line. Thus a user may assemble the frustoconical member around a plant and thence secure an irrigation line in position securing a nozzle disposed to introduce water, or other solution, into the space underlying said frustoconical member whereby water is conservable during irrigation, soil moisture retention is better enabled, and ambient humidity (when the present device is used interior to a conditioned space) is more controllable.

For use along particular plant beds, or for use around more than one plant grown adjacently or in series, the present invention includes a plurality of rectilinear insert sections fittable between the first and second sections to secure said first and second sections together spaced apart, whereby the aperture formed at the truncated apex of the frustoconical member is elongated. Each of the plurality of rectilinear sections includes at least one first rectilinear section, devised for mating interconnection between the male edge of the first section and the female edge of the second section, and at least one second rectilinear section, devised for mating interconnection between the female edge of the first section and the male edge of the second section.

The first rectilinear insert section, therefore, includes a parallelepiped body having a first insert male edge and a first insert female edge. The first insert male edge is substantially similar to the male edge of each of the first and second sections, whereby said first insert male edge appropriately engages into the female edge of the second section in like manner as the male edge of the first section. The first rectilinear section first insert female edge is substantially similar to the female edge of each of the first and second sections, whereby said first insert female edge engages with the male edge of the first section in like manner as the female edge of the second section. Thus, the first rectilinear insert section is positional interconnected in between each of the first and second sections to secure said first and second sections together spaced apart by the width of the first rectilinear section.

Likewise, the second rectilinear section includes a second insert male edge and a second insert female edge disposed to superimpose with each of the female edge and male edge of each of the first and second sections respectively. One of skill in the art will appreciate, therefore, that more than one of each first and second rectilinear insert sections is connectable serried together to space said first and second sections yet farther apart.

Thus a partition is erectable sectioning the atmosphere above and below the frustoconical member whereby a concentration gradient is creatable along the delimit of the frustoconical member. The sloped and curved surfaces are effective to maintain a concentration gradient whereby vapor condenses and drains down the underside of the first and second curved surfaces, and any insert sections as may be employed, to reenter the soil matrix.

Each of the first and second sections may be enantiomorphic, that is are "mirror images", whereby production of a pair of first sections enables self-coupling of each first section together. Production of the first and second sections is therefore halved to a single part that self-couples formative of the frustoconical member. A single rectilinear member is thereby producible conformant to insertion between each half of the frustoconical member. A plurality of alike rectilinear members is thereby insertable between each section of the frustoconical member to space the insert aperture as wide as desired.

In at least one embodiment contemplated herewith, a soil moisture status is visually signaled to a user when a threshold condition is reached. The visual signal thereby alerts a user that the threshold condition has occurred whereby appropriate and responsive action may be undertook. The visual signal may be a color change, for example, whereby a polychromic material exhibits a color change in response to an environmental stimulus. For example, a hydrochromic material may be included to signal a color change at a threshold relative humidity, say. The visual signal may also be effected by a thermochromic material, say; that is, color change may be signaled to a user when a temperature threshold is reached. Where color change of such polychromic materials is inhibited by incidence of Ultra Violet ("UV") light, a translucent over-layer is contemplated as disposed upon the frustoconical member to impede interference of UV light whereby color change is not prevented.

Thus has been broadly outlined the more important features of the present impermeable sectional apparatus for soil moisture retention so that the detailed description thereof that follows may be better understood and in order that the present contribution to the art may be better appreciated.

Objects of the present impermeable sectional apparatus for soil moisture retention, along with various novel features that characterize the invention are particularly pointed out in the claims forming a part of this disclosure. For better understanding of the impermeable sectional apparatus for soil moisture retention, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, and in particular FIGS. 1 through 11 thereof, example of the instant impermeable sectional apparatus for soil moisture retention employing the principles and concepts of the present impermeable sectional apparatus for soil moisture retention and generally designated by the reference number 10 will be described.

Referring to FIGS. 1 through 11 example embodiments of the present impermeable sectional apparatus for soil moisture retention 10 are illustrated.

The present impermeable sectional apparatus for soil moisture retention 10 has been devised to inhibit evaporation of soil moisture from a ground surface proximally surrounding a cultivated plant 100. The present impermeable sectional apparatus for soil moisture retention 10 includes an open-topped right circular frustoconical member 20 that is separable into halves along a medial longitudinal axis, and re-connectable together, to enable erection of the frustoconical member 20 surrounding a cultivated plant 100 whereby evaporation of drip irrigation directed to the ground surface enclosed underneath said frustoconical member 20 is inhibited due to containment of vapor maintained beneath said frustoconical member 20. Water is thus conserved during cultivation.

Figure 7:
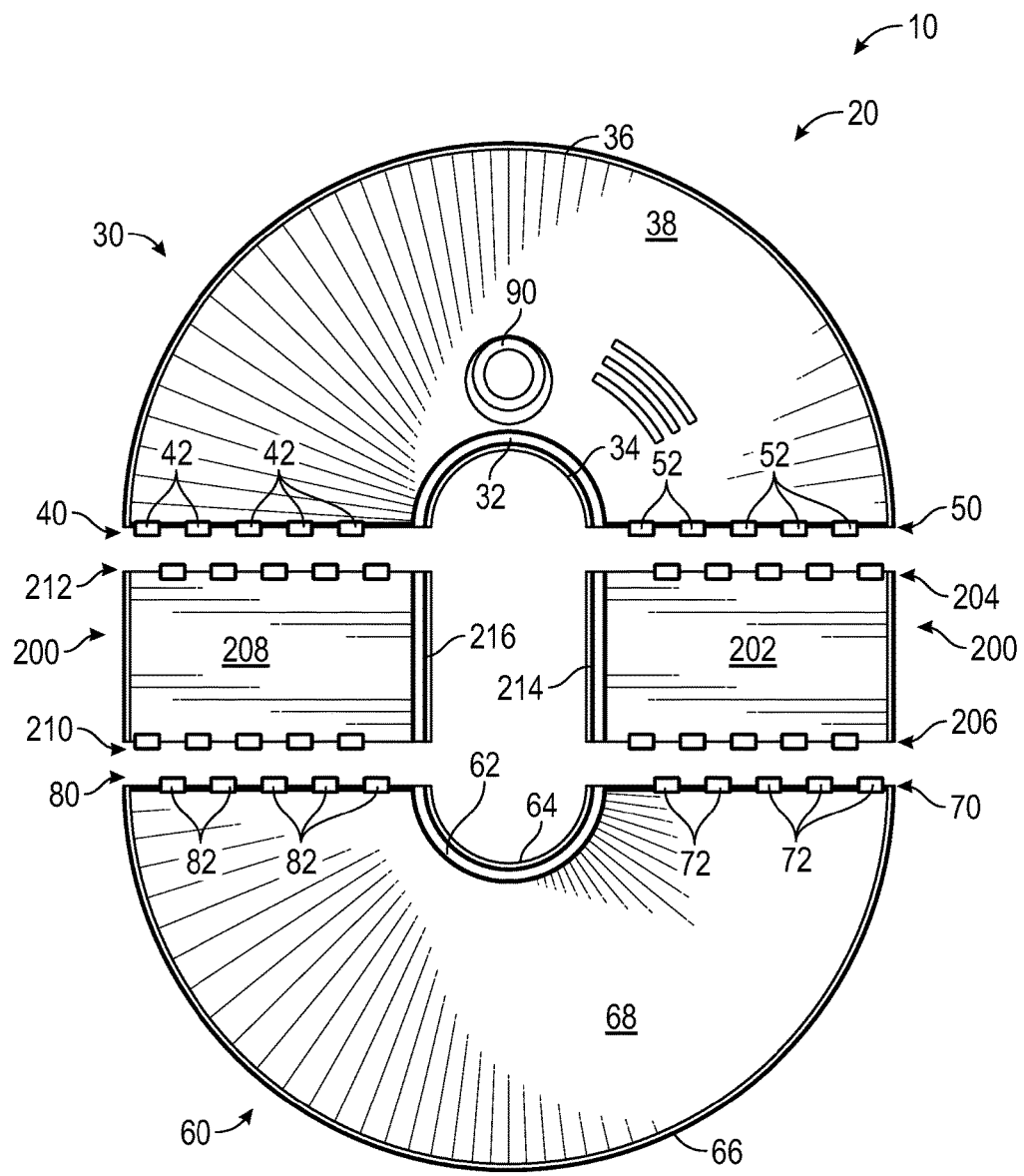
FIG. 7 is a bottom view of an example embodiment having each of the first and second rectilinear insert sections disposed in position to interconnect the first and second sections spaced apart.
Figure 10:
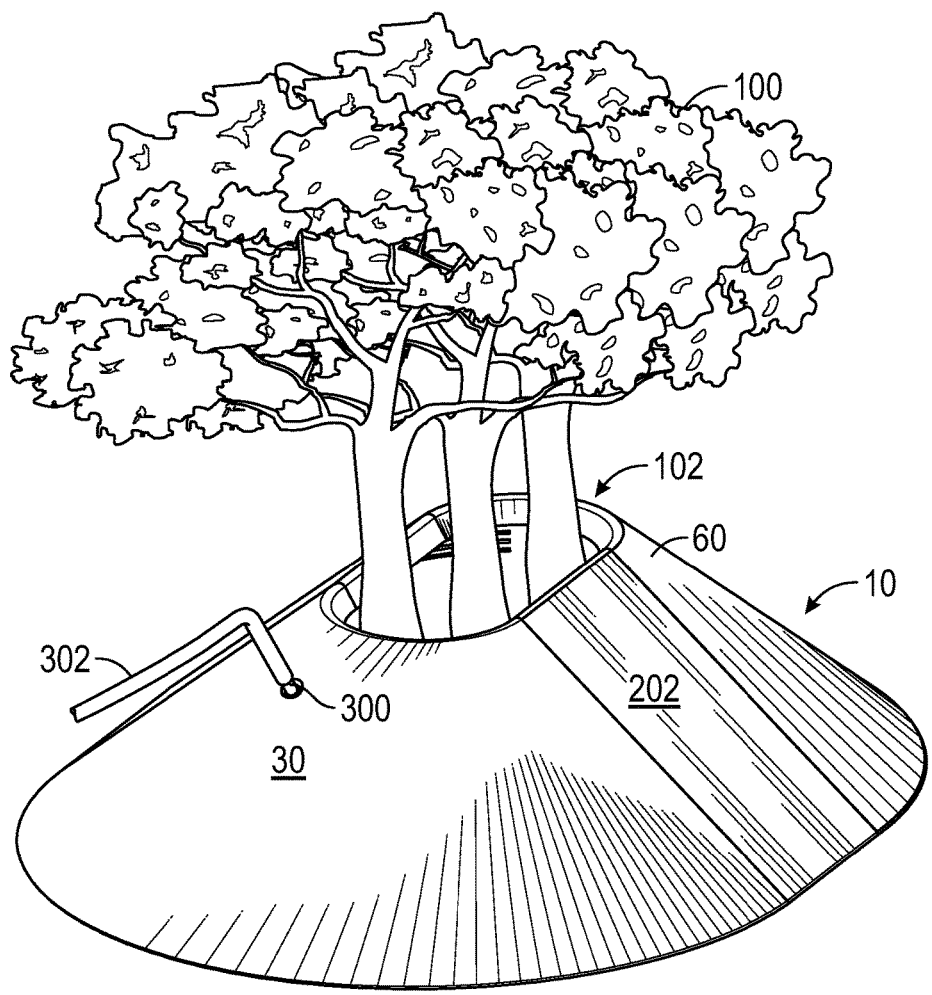
FIG. 10 is an isometric in-use view of an example embodiment erected around a plurality of cultivated plants to cover a plant bed.

The present impermeable sectional apparatus for soil moisture retention 10 further comprises a plurality of rectilinear inserts 200 connectable in between each half of the frustoconical member 20, whereby the impermeable sectional apparatus for soil moisture retention 10 is erectable to accommodate larger plants, or multi-stemmed plants as case may be, and overlie a greater area of ground surface for soil moisture retention therein (see for example FIG. 7 and FIG. 10).

Figure 1:
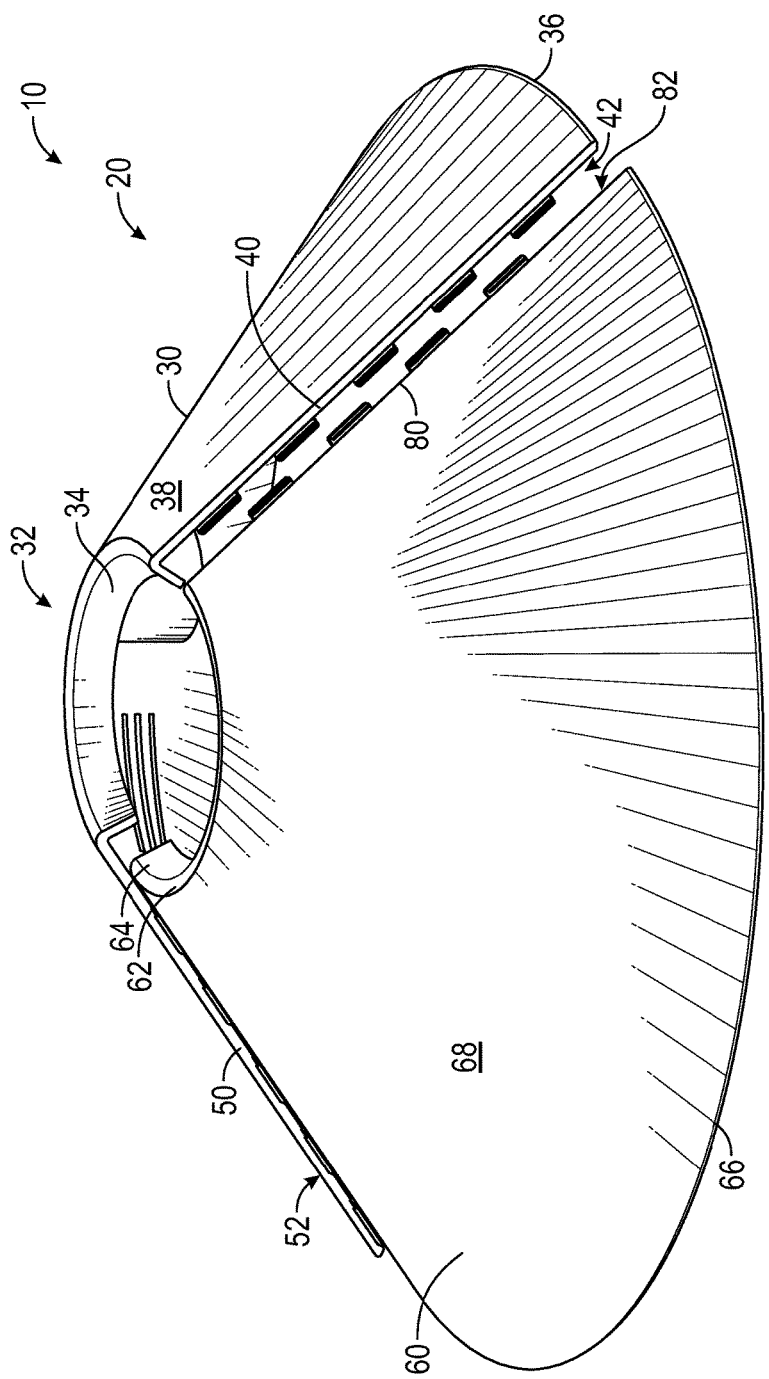
FIG. 1 is an isometric view of an example embodiment.
Figure 3:
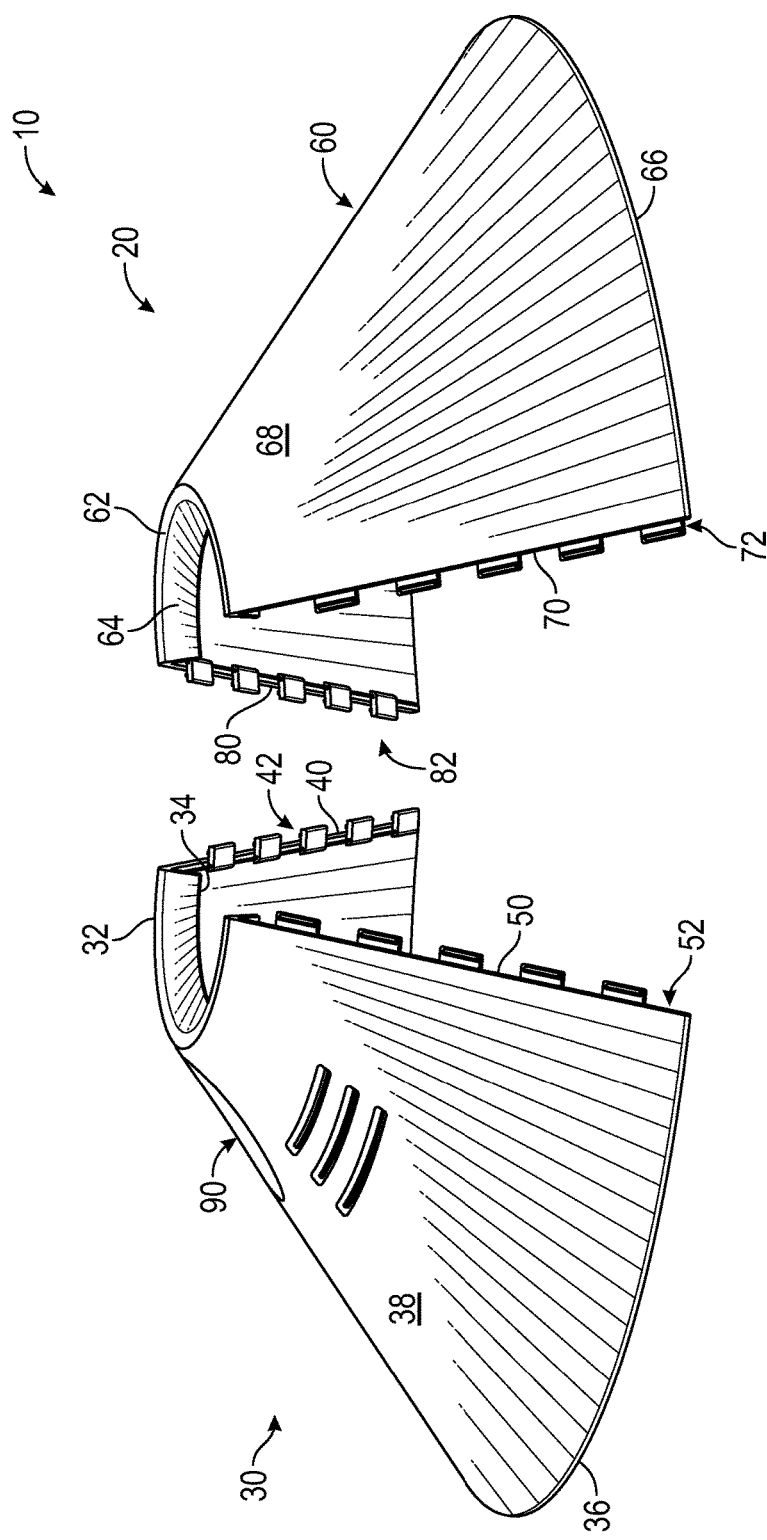
FIG. 3 is an isometric view of an example embodiment illustrating a first and second section spaced apart.
Figure 4:
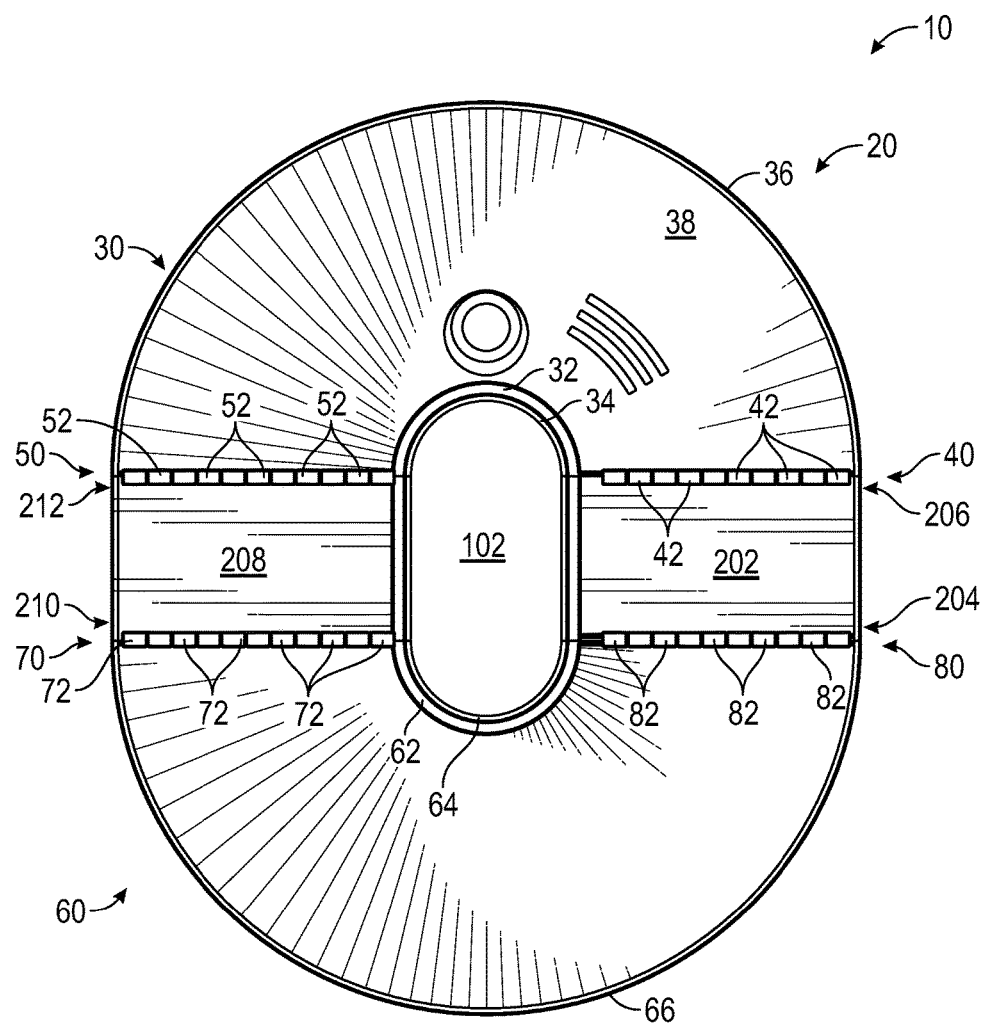
FIG. 4 is a bottom view of an example embodiment having each of a first and second rectilinear insert sections disposed interconnecting the first and second sections spaced apart.
Figure 5:
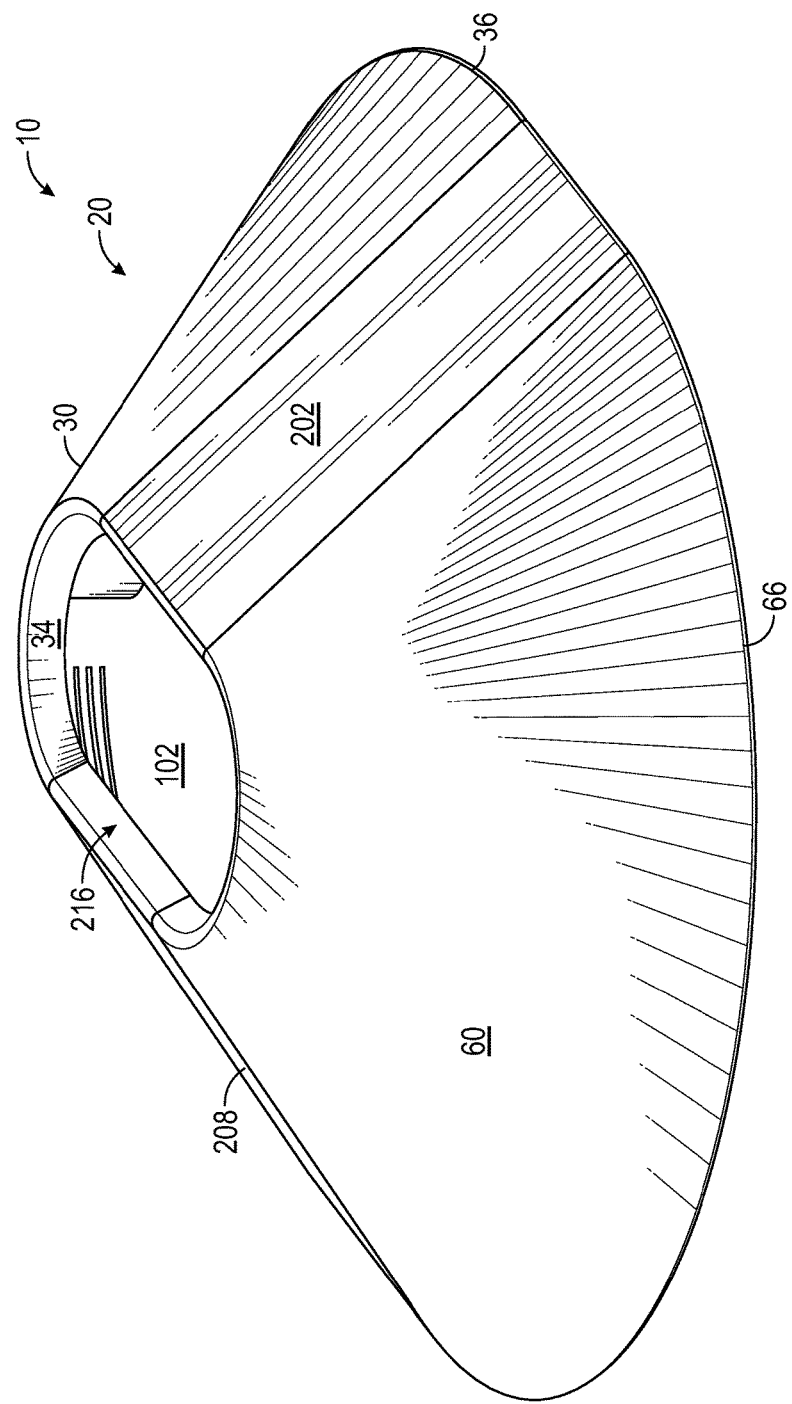
FIG. 5 is an isometric view of an example embodiment having each of the first and second rectilinear insert sections disposed interconnecting the first and second sections spaced apart.
Figure 6:
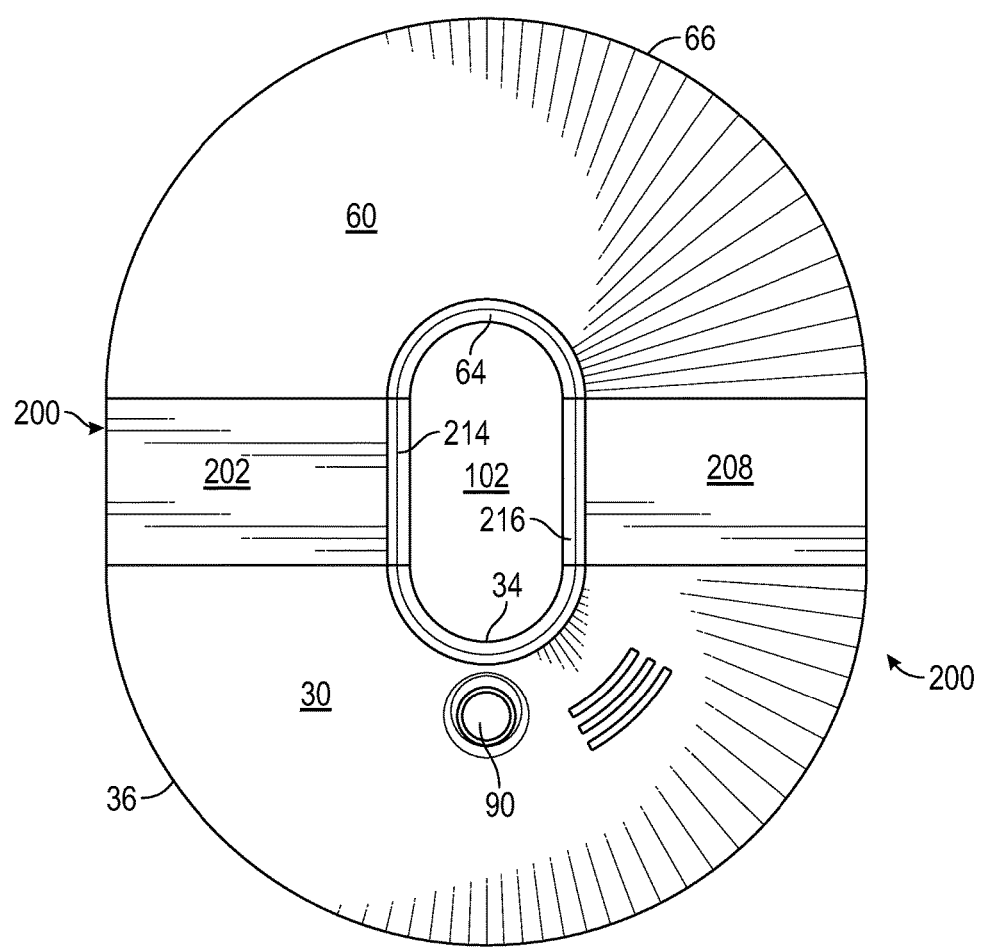
FIG. 6 is a top view of an example embodiment having each of the first and second rectilinear insert sections disposed interconnecting the first and second sections spaced apart.
Figure 8:
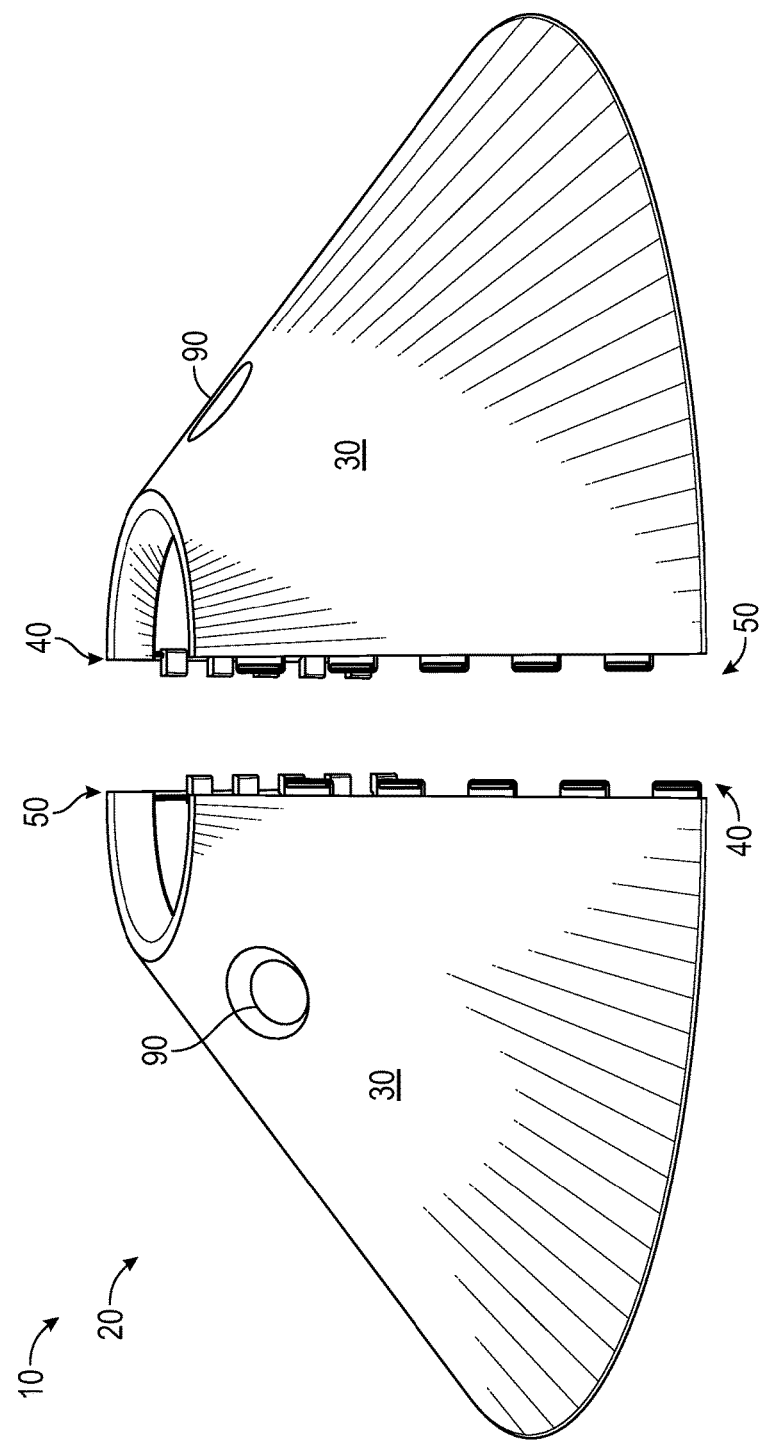
FIG. 8 is a side view of an example embodiment illustrating interconnectivity of a first section self-connecting to an oppositely positioned first section.
Figure 9:
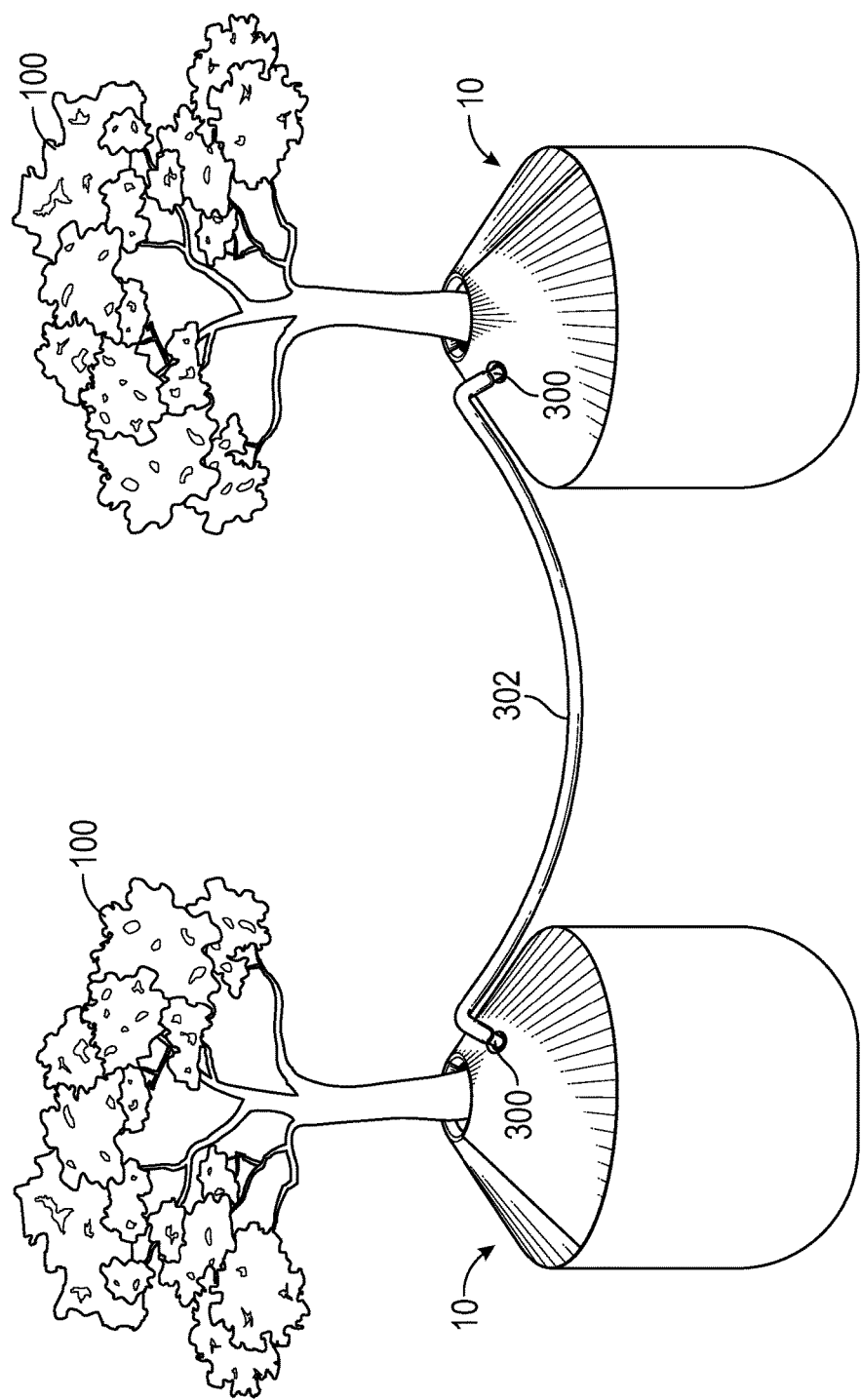
FIG. 9 is an isometric in-use view of an example embodiment erected around a cultivated plant.

The present impermeable sectional apparatus for soil moisture retention 10, therefore, includes a first section 30 and a second section 50 connectable together to form the right-circular frustoconical member 20. Each of the first and second sections 30, 60 comprises substantially half said frustoconical member 20 and each is devised for mating interconnection when edgewise engaged together. Thus, as shown in FIGS. 1, 3, and 8, a first male edge 40 of a first section 30 of the frustoconical member 20 mates with a second female edge 80 of a second section 60 of the frustoconical member 20, and a first female edge 50 of the first section 30 likewise mates with a second male edge 70 of the second section 60, as will be described subsequently.

The first section 30 includes a first open top section 32, a first inverted edge 34 disposed down-facing from the first open top section 32, and a first semicircular edge 36 disposed for contact with a ground surface. A first curved surface 38 is disposed sloped between the first open top section 32 and the first semicircular edge 36. The first male edge 40 is disposed terminating one side of the first curved surface 38, and thus slopes from the first open top section 32 down to adjoin the first semicircular edge 36. The first female edge 50 is likewise disposed terminating the other side of the first curved surface 38.

The second section 60 includes a second open top section 62 which, when the second section 60 is joined to conjunct the first section 30 in the manner described below, forms an aperture 102 bounded by the first open top section 32 and the second open top section 62. This aperture 102 is devised to encircle a stem of a plant 100 around which the present device 10 is erected. A second inverted edge 64 is disposed down-facing around the second open top section 62, which second inverted edge 64 likewise adjoins the first inverted edge 34 to form said aperture 102 circumscribed atop the frustoconical member 20 when each of the first and second sections 30, 60 is joined together, as will be described subsequently.

A second semicircular edge 66 is disposed for contact with a ground surface, said second semicircular edge 66 forming a circumference in conjunction with the first semicircular edge 36 when each of the first and second sections 30, 60 are joined together, whereby a circular area of ground surface is coverable by the present device 10. A second curved surface 68 is likewise disposed between the second open top section 62 and the second semicircular edge 66, whereby the frustoconical member 20 is formable by joining the first and second sections 30, 60 together. The first and second curved surfaces 38, 68 thus overlie the underlying ground surface and inhibit evaporation of moisture from the soil thereunder. Vapor volatizing from the soil matrix is thus impeded by the first and second curved surfaces 38, 68 from the atmosphere, and said vapor is caused to condense upon an underside of said first and second curved surfaces 38, 68. Water in the liquid phase is thereby returned toward the soil by the action of gravity along the sloped interior of the first and second curved surfaces 38, 68, and along the interior sloped surface of the first and second inverted edges 34, 64 at a truncated apex of the frustoconical member 20.

Figure 2:
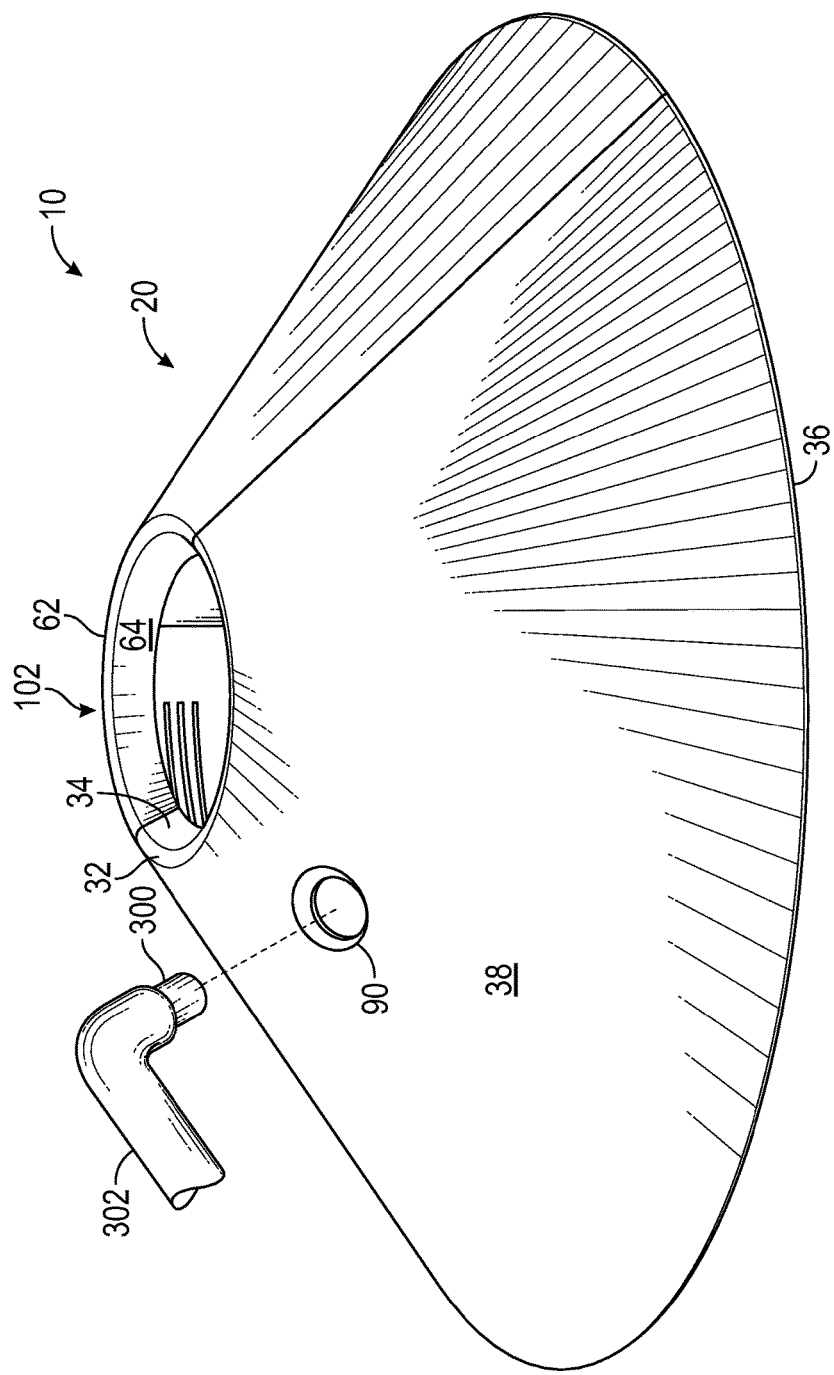
FIG. 2 is an isometric view of an example embodiment having a first and second section connected together into a frustoconical member.

An insert aperture 90 is disposed in at least the second curved surface 68 wherein an existing nozzle 300 of an irrigation line 302 is securable (see for example FIG. 2). The insert aperture 90 is disposed to engage the irrigation line 302 nozzle 300 in a position whereby the irrigation line 302 is securable such that the nozzle 300 directs water introducible to the ground surface immediately underlying the frustoconical member 20. The insert aperture 90 may be formed as an involuted frustoconical depression into which the existing nozzle 300 fittingly engages.

A second male edge 70 is disposed terminating one side of the second curved surface 68 in a position to oppose the first female edge 50 of the first section 30, and a second female edge 80 is disposed terminating the other side of the second curved surface 68 in a position to oppose the first male edge 40 of the first section whereby mating interconnection of the first and second sections 30, 60 is securably enabled. At least the second section 60 includes the insert aperture 90, disposed in the second curved surface 68 to securely engage an existing drip irrigation nozzle 300 whereby an existing drip irrigation system 302 is connectable to position each irrigation nozzle 300 to introduce water to the space confined underlying the frustoconical member 20. A microclimate is thus maintainable underneath the frustoconical member 20 whereby soil moisture content is maintainable with less additional water required, and an increased level of humidity underneath the frustoconical member 20 relative the humidity of the ambient atmosphere above the frustoconical member 20 acts to inhibit soil moisture loss by lessening the osmotic differential which would otherwise exist between the soil and the atmosphere at the soil-air interface. More water is thereby available to the plant 100 about which the frutoconical member 20 is erected and less water is required during irrigation to maintain moisture availability in the rhizosphere.

Discussing now the first section 30, the first male edge 40 includes a first configuration of tooth members 42 disposed serried and projected perpendicularly from the underside of the first curved surface 38. The first configuration of tooth members 42 is devised to interlace with a second configuration of tooth members 82, disposed upon the second female edge of 80 of the second section 60 and spaced apart appropriately to interlace in gripping configuration with the first configuration of tooth members 42. The first female edge 50, disposed at the opposite end of the first curved surface 38, likewise includes a second configuration of tooth members 52 disposed upon the underside of the first curved surface 38 substantially similar with the second configuration of tooth members 82 disposed upon the second female edge 80 of the second section 60. This second configuration of tooth members 52 is likewise devised for interlacing engagement with a first configuration of tooth members 72 disposed upon the second male edge 70 of the second section 60. Thus interlacement of each of the first and second configurations of tooth members upon each of the respective first and second sections enables securement of the first and second sections 30, 60 formative of the furstoconical member.

Thus abutment of each of the first and second sections 30, 60 effects securement of the first male edge 40 in mated contact with the second female edge 60 by edgewise engagement, whereby each first configuration of tooth members 42, 72 is interlaceable into each second configuration of tooth members 82, 52, respectively. See FIG. 2.

A plurality of rectilinear insert sections 200 is included to enable enlargement of the aperture 102 between the first and second sections 30, 60 for accommodation of larger plants, or multi-stemmed plants as case may be (see for example FIG. 10). Each of the plurality of rectilinear sections 200 is disposed for interconnection between the first section 30 and the second section 60 whereby said first and second sections 30, 60 are connectable spaced apart to cover more ground surface therebeneath.

The plurality of rectilinear insert sections 200 includes at least one first rectilinear insert section 202 devised for insertion between the first male edge 40 of the first section 30 and the second female edge 80 of the second section 60, whereby said at least one first rectilinear insert section 202 includes a first insert male edge 204 of like structure as the first male edge 40 and a first insert female edge 206 of like structure as the second female edge 80 whereby said at least one first rectilinear insert member 202 engages with each of said first male edge 40 and second female edge 80 to space the first and second sections 30, 60 apart by a width of said first rectilinear member 202. The first rectilinear insert section 202 also includes a first insert sloped top edge 214 disposed to align congruently between the first inverted edge 34 and the second inverted edge 64 as a down-pointing extremity for formation of drips subsequent condensation of vapor in the space underlying the frustoconical member 20.

Likewise, the plurality of rectilinear insert sections 200 also includes at least one second rectilinear insert section 208 having a second insert female edge 212 alike the first female edge 50 of the first section 30, and a second insert male edge 210 alike the second male edge 70 of the second section 60, whereby said second rectilinear insert section 208 is fittable to connect in between the first female edge 50 and the second male edge 70 of the first and second sections 30, 60 respectively. The second rectilinear insert section 208 also includes a second insert sloped top edge 216 disposed to align congruently with the first and second inverted edges 34, 64 of the first and second sections 30, 60. See for example FIGS. 4 and 7.

Thus each of the first and second sections 30, 60 is connectable spaced apart whereby the aperture 102 formed at each of the first and second open top sections 32, 62 is elongated to accommodate wider stemmed plants or a plurality of plants, as case may be (as shown, for example, in FIG. 10). Potentially innumerable rectilinear insert sections 200 are contemplated as connectable serried together to space each of the first and second sections 30, 60 apart.

In the example embodiment depicted, each of the first and second sections 30, 60 is enantiomoprhic and duplicable whereby tooling required for manufacture is reducible to a single iteration of parts. Thus, the first and second sections 30, 60 are relative and may be duplicates of a single, manufactured part (see for example FIG. 8). Thus production of a pair of first sections enables coupling together to form the frustoconical member 20. In this instance, the terms "first" and "second" as applied to the first and second sections 30, 60 are used merely to distinguish compatible structures devised to enable mating engagement between the male edges 40, 70 and the female edges 50, 80 and for clarity in discussing the metes and bounds of the invention.

Figure 11:
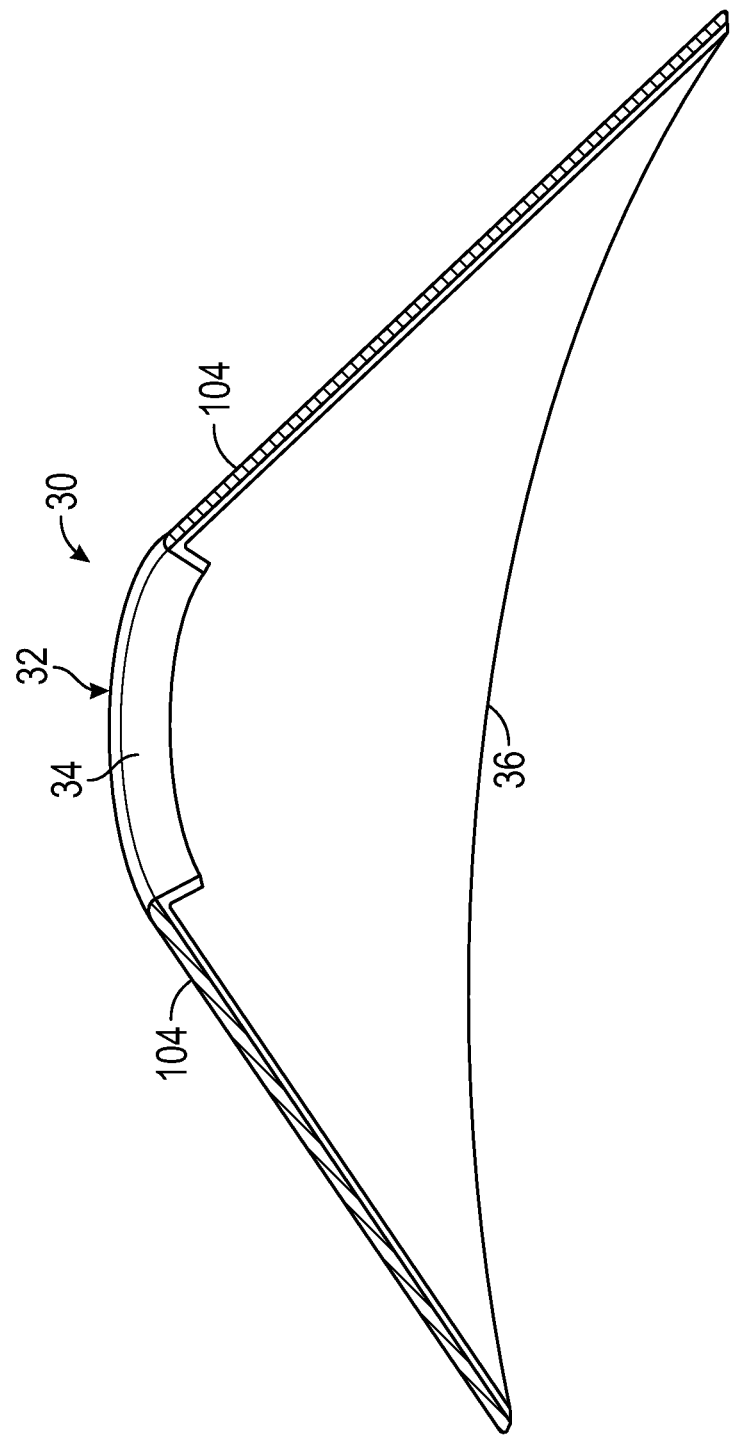
FIG. 11 is a cross-section view of an example embodiment of a first section depicting a translucent over-layer devised to impede incidence of UV light upon a polychromic material.

The present impermeable sectional apparatus for soil moisture retention 10 is further devised to signal a soil moisture status to a user to alert said user a conditional threshold has been met. In an embodiment contemplated herein, the soil moisture status is signaled to a user visually by color change. The color change may be effected by hydochromic material configured to change color along a gradient of osmotic potential. Alternately the color change may be effected by inclusion of a thermochromic material devised to change color along a temperature gradient. In at least one embodiment, as shown in FIG. 11, a translucent over-layer 104 is contemplated comprising at least a portion of the frustoconical member whereby incidence of UV light upon the hydrochromic and thermochromic material is preventable.

What is claimed is:

1. An impermeable sectional apparatus for soil moisture retention comprising:
   an open-topped right-circular frustoconical member separable and connectable along a medial longitudinal axis centrally disposed sectioning said frustoconical member into halves, said frustoconical member comprising:
      a first section having:
         a first open top section;
         a first inverted edge disposed down-facing around the first open top section;
         a first semicircular edge disposed for contact with a ground surface;
         a first curved surface disposed between the first open top section and the first semicircular edge;

a first male edge disposed terminating one side of the first curved surface;

a first female edge disposed terminating the other side of the first curved surface;

a second section having:

a second open top section;

a second inverted edge disposed down-facing around the second open top section;

a second semicircular edge disposed for contact with the ground surface;

a second curved surface disposed between the second open top section and the second semicircular edge;

a second male edge disposed terminating one side of the second curved surface;

a second female edge disposed terminating the other side of the second curved surface; and an insert aperture disposed in at least the second curved surface, said insert aperture comprising an involuted frustoconical depression into which an existing nozzle of a drip irrigation line fittingly engages;

wherein the first section releasably secures edgewise connected to the second section by mating engagement effective between the first male edge and the second female edge and the first female edge and the second male edge whereby an aperture is creatable between each first and second open top section accommodative of a plant stem therethrough and drip irrigation directed through the insert aperture to a ground surface thereunder maintains soil moisture content, whereby evaporative loss from said ground surface is mitigated.

2. The impermeable sectional apparatus for soil moisture retention of claim 1 further comprising a plurality of rectilinear insert sections disposed to interconnect between each of the first section and the second section whereby said first and second sections are connectable spaced apart to cover more ground surface therebeneath.

3. The impermeable sectional apparatus for soil moisture retention of claim 2 wherein the first male edge comprises a first configuration of tooth members spaced apart and serried projected perpendicularly form said first male edge and the first female edge comprises a second configuration of tooth members spaced apart and serried projected perpendicularly therefrom in alternating sequence relative the first configuration of tooth members.

4. The impermeable sectional apparatus for soil moisture retention of claim 3 wherein the second male edge comprises the first configuration of tooth members and the second female edge comprises the second configuration of tooth members whereby join of the first and second sections is effected by interlacing engagement of each of the first and second configurations of tooth members.

5. The impermeable sectional apparatus for soil moisture retention of claim 4 wherein the plurality of rectilinear sections comprises at least a first rectilinear insert section and a second rectilinear insert section, said first rectilinear section devised for interconnection between the first male edge and the second female edge and said second rectilinear section devised for interconnection between the first female edge and the second male edge, said first rectilinear insert section having:

a first insert male edge alike the first male edge;

a first insert female edge alike the second female edge; and said second rectilinear insert section having:

a second insert male edge alike the second male edge; and a second insert female edge alike the first female edge;

wherein each of said first and second rectilinear insert sections connect edgewise in between the first and second sections.

6. The impermeable sectional apparatus for soil moisture retention of claim 5 further comprising a polychromic material devised to visually signal occurrence of an environmental stimulus.

7. The impermeable sectional apparatus for soil moisture retention of claim 6 wherein the polychromic material comprises a hydrochromic material.

8. The impermeable sectional apparatus for soil moisture retention of claim 6 wherein the polychromic material comprises a thermochromic material.

9. An impermeable sectional apparatus for soil moisture retention comprising:

an open-topped right-circular frustoconical member separable and connectable along a medial longitudinal axis centrally disposed sectioning said frustoconical member into halves, said frustoconical member comprising:

a first section having:

a first open top section;

a first inverted edge disposed down-facing around the first open top section;

a first semicircular edge disposed for contact with a ground surface;

a first curved surface disposed between the first open top section and the first semicircular edge;

a first male edge disposed terminating one side of the first curved surface, said first male edge having a first configuration of tooth members serried projected perpendicularly therefrom;

a first female edge disposed terminating the other side of the first curved surface, said first female edge having a second configuration of tooth members serried projected perpendicularly therefrom, said second configuration of tooth members devised in alternating sequence relative the first configuration of tooth members at the first male edge;

a second section having:

a second open top section;

a second inverted edge disposed down-facing around the second open top section;

a second semicircular edge disposed for contact with the ground surface;

a second curved surface disposed between the second open top section and the second semicircular edge;

a second male edge disposed terminating one side of the second curved surface, said second male edge having the first configuration of tooth members;

a second female edge disposed terminating the other side of the second curved surface having the second configuration of tooth members;

an insert aperture disposed in at least the second curved surface, said insert aperture disposed to securely engage an existing drip irrigation nozzle; and a plurality of rectilinear insert sections disposed to interconnect between each of the first section and the second section and said first and second sections are thereby connectable spaced apart;

wherein the first section releasably secures edgewise connected to the second section by mating engagement effective between the first male edge and the second female edge and the first female edge and the second male edge whereby an aperture is creatable between each first and second open top section accommodative of a plant stem therethrough and drip irrigation directed through the insert aperture to a ground surface thereunder maintains soil moisture content, whereby evaporative loss from said ground surface is mitigated.

10. The impermeable sectional apparatus for soil moisture retention of claim 9 wherein the first and second sections are enantiomorphic.

11. The impermeable sectional apparatus for soil moisture retention of claim 10 further comprising a polychromic material devised to visually signal occurrence of an environmental stimulus.

12. The impermeable sectional apparatus for soil moisture retention of claim 11 further comprising a translucent over-layer disposed upon at least a portion of the frustoconical member, said translucent over-layer disposed to impede incidence of Ultra Violet light upon the polychromic material.

13. The impermeable sectional apparatus for soil moisture retention of claim 12 wherein the polychromic material comprises a hydrochromic material.

14. The impermeable sectional apparatus for soil moisture retention of claim 12 wherein the polychromic material comprises a thermochromic material.

15. An impermeable sectional apparatus for soil moisture retention comprising:
   an open-topped right-circular frustoconical member separable and connectable along a medial longitudinal axis centrally disposed sectioning said frustoconical member into halves, said frustoconical member comprising:
      a first section having:
         a first open top section;
         a first inverted edge disposed down-facing around the first open top section;
         a first semicircular edge disposed for contact with a ground surface;
         a first curved surface disposed between the first open top section and the first semicircular edge;
         a first male edge disposed terminating one side of the first curved surface;
         a first female edge disposed terminating the other side of the first curved surface;
      a second section having:
         a second open top section;
         a second inverted edge disposed down-facing around the second open top section;
         a second semicircular edge disposed for contact with the ground surface;
         a second curved surface disposed between the second open top section and the second semicircular edge;
         a second male edge disposed terminating one side of the second curved surface;
         a second female edge disposed terminating the other side of the second curved surface;
         an insert aperture disposed in at least the second curved surface, said insert aperture disposed to securely engage an existing drip irrigation nozzle; and
      a plurality of rectilinear insert sections disposed to interconnect between each of the first section and the second section whereby said first and second sections are connectable spaced apart to cover more ground surface therebeneath;
   wherein the first section releasably secures edgewise connected to the second section by mating engagement effective between the first male edge and the second female edge and the first female edge and the second male edge whereby an aperture is creatable between each first and second open top section accommodative of a plant stem therethrough and drip irrigation directed through the insert aperture to a ground surface thereunder maintains soil moisture content, whereby evaporative loss from said ground surface is mitigated.

* * * * *